United States Patent
Wang et al.

(10) Patent No.: US 10,932,200 B2
(45) Date of Patent: Feb. 23, 2021

(54) UPLINK POWER CONTROL METHOD AND APPARATUS TO REDUCE USER EQUIPMENT-TO-USER EQUIPMENT CROSS INTERFERENCE

(71) Applicant: HUAWEI TECHNOLOGIES CO., LTD., Guangdong (CN)

(72) Inventors: Yafei Wang, Shanghai (CN); Chi Zhang, Shanghai (CN); Zhengwei Gong, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/365,698

(22) Filed: Mar. 27, 2019

(65) Prior Publication Data

US 2019/0223108 A1 Jul. 18, 2019

Related U.S. Application Data

(63) Continuation of application No. PCT/CN2017/103610, filed on Sep. 27, 2017.

(30) Foreign Application Priority Data

Sep. 30, 2016 (CN) .......................... 201610878909.6

(51) Int. Cl.
*H04W 52/14* (2009.01)
*H04W 52/24* (2009.01)
*H04B 17/318* (2015.01)

(52) U.S. Cl.
CPC ........ *H04W 52/146* (2013.01); *H04B 17/318* (2015.01); *H04W 52/243* (2013.01)

(58) Field of Classification Search
CPC . H04W 52/146; H04W 52/243; H04B 17/318
See application file for complete search history.

(56) References Cited

U.S. PATENT DOCUMENTS

| | | | |
|---|---|---|---|
| 9,948,432 B2 * | 4/2018 | Eriksson | H04W 76/28 |
| 10,028,237 B2 * | 7/2018 | Lee | H04L 5/1469 |

(Continued)

FOREIGN PATENT DOCUMENTS

| | | |
|---|---|---|
| CN | 102014504 A | 4/2011 |
| CN | 103037488 A | 4/2013 |

(Continued)

OTHER PUBLICATIONS

Qualcomm Incorporated, Interference mitigation schemes. 3GPP TSG RAN WG1 Meeting #72, Jan. 28-Feb. 1, 2013, St. Julian's, Malta, R1-130586, 5 pages.

(Continued)

*Primary Examiner* — Mounir Moutaouakil
(74) *Attorney, Agent, or Firm* — Womble Bond Dickinson (US) LLP

(57) ABSTRACT

This application provides an uplink control method and apparatus. The method includes: measuring, by first UE, a first signal on a first time-frequency resource, to obtain a measurement result, where the first signal is a signal formed by superposing second signals sent by at least one second UE on a second time-frequency resource, and a time-domain resource of the first time-frequency resource belongs to a first time-domain resource unit; and controlling, by the first UE, power of uplink data on the first time-domain resource unit based on the measurement result. According to the uplink power control method and apparatus provided in this application, UE-to-UE cross interference can be reduced.

15 Claims, 6 Drawing Sheets

(56) References Cited

U.S. PATENT DOCUMENTS

| | | | | |
|---|---|---|---|---|
| 10,321,322 B2* | 6/2019 | Yang | .................... | H04W 16/02 |
| 10,412,620 B2* | 9/2019 | Nory | ................... | H04W 52/346 |
| 10,454,630 B2* | 10/2019 | Qu | ........................ | H04L 1/1861 |
| 10,542,503 B2* | 1/2020 | Nory | ................... | H04W 52/346 |
| 10,568,041 B2* | 2/2020 | MolavianJazi | ....... | H04W 52/10 |
| 10,582,492 B2* | 3/2020 | Lee | ....................... | H04L 5/0053 |
| 10,588,036 B2* | 3/2020 | Sadeghi | ............... | H04W 24/10 |
| 2014/0160968 A1 | 6/2014 | Sahlin | | |
| 2016/0029239 A1 | 1/2016 | Sadeghi et al. | | |

FOREIGN PATENT DOCUMENTS

| | | |
|---|---|---|
| CN | 103703826 A | 4/2014 |
| CN | 104023382 A | 9/2014 |
| CN | 105228234 A | 1/2016 |
| EP | 2941006 A1 | 11/2015 |

OTHER PUBLICATIONS

Sharp, UL power control based interference mitigation for eIMTA. 3GPP TSG RAN WG1 Meeting #73 Fukuoka, Japan, May 20-24, 2013, R1-132351, 14 pages.

NTT DOCOMO, INC., Initial views on frame structure for NR access technology. 3GPP TSG RAN WG1 Meeting #84bis Busan, Korea Apr. 11-15, 2016, R1-163112, 7 pages.

3GPP TSG RAN WG1 Meeting #74, R1-133201, Panasonic: "UL power control method to mitigate interference in Eimta", Barcelona, Spain, Aug. 19-23, 2013, total 3 pages. XP050716032.

3GPP TSG-RAN WG1 Meeting #75, R1-135558, Nokia, NSN: "Remaining details for enhanced UL power control for TDD Eimta", San Francisco, USA, Nov. 11-15, 2013, total 4 pages. XP050735223.

\* cited by examiner

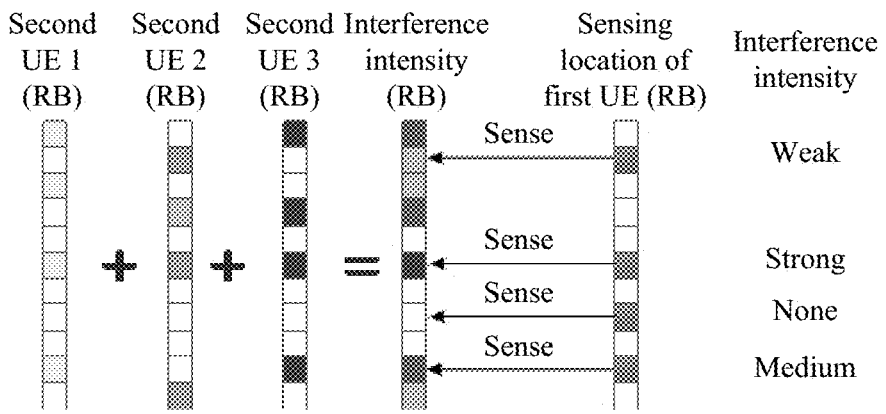
FIG. 9
| Interference level | 1 | 2 | 3 | 4 | 5 | 6 | 7 | 8 | 9 |
|---|---|---|---|---|---|---|---|---|---|
| Power control parameter | P0_1 ∂_1 TPC_1 | P0_2 ∂_2 TPC_2 | P0_3 ∂_3 TPC_3 | P0_4 ∂_4 TPC_4 | P0_5 ∂_5 TPC_5 | P0_6 ∂_6 TPC_6 | P0_7 ∂_7 TPC_7 | P0_8 ∂_8 TPC_8 | P0_9 ∂_9 TPC_9 |
| Interference intensity | Low | | | Medium | | | High | | |
FIG. 10
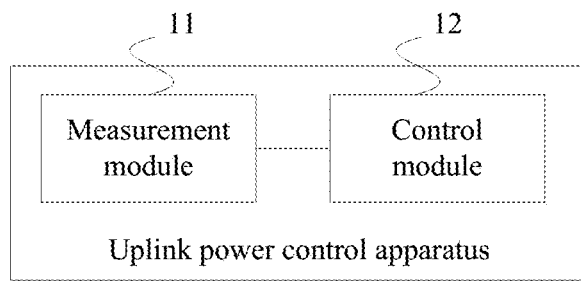
FIG. 11

UPLINK POWER CONTROL METHOD AND APPARATUS TO REDUCE USER EQUIPMENT-TO-USER EQUIPMENT CROSS INTERFERENCE

CROSS-REFERENCE TO RELATED APPLICATIONS

This application is a continuation of International Application No. PCT/CN2017/103610, filed on Sep. 27, 2017, which claims priority to Chinese Patent Application No. 201610878909.6, filed on Sep. 30, 2016. The disclosures of the aforementioned applications are hereby incorporated by reference in their entireties.

TECHNICAL FIELD

Embodiments of this application relate to the field of communications technologies, and in particular, to an uplink power control method and apparatus.

BACKGROUND

In dynamic time division duplex (D-TDD for short), a TDD uplink-downlink subframe configuration may be dynamically adjusted based on uplink-downlink resource requirements of different services, so as to optimize resource utilization. Although the dynamic TDD has the foregoing advantage, severe cross interference, mainly including network-to-network interference and user equipment-to-user equipment (UE for short) interference, exists in actual deployment and application, seriously reducing uplink performance/downlink edge performance.

In the prior art, in enhanced interference management and traffic adaptation (eIMTA for short) in Long Term Evolution (LTE for short), a double-loop uplink power control enhanced solution that is based on a subframe set is used, including open-loop power control enhancement and closed-loop power control enhancement. The subframe set includes a variable subframe set and a fixed subframe set. In addition, different subframe sets are configured by a network side in a semi-static manner. UE-to-UE cross interference exists in the variable subframe set, but no cross interference exists in the fixed subframe set. Therefore, different power control parameter sets are used for the two different types of subframe sets.

However, in the prior art, although an open-loop power control parameter and a closed loop power control parameter depend on the two types of subframe sets, and this can implement subframe configuration mode switch and power control based on different data transmission service types, the UE-to-UE cross interference can be further reduced in this power control manner.

SUMMARY

Embodiments of this application provide an uplink power control method and apparatus, to resolve a prior-art problem that system throughput is relatively low due to cross interference existing between UEs.

According to a first aspect, an embodiment of this application provides an uplink power control method, including:

measuring, by first UE, a first signal on a first time-frequency resource, to obtain a measurement result, where the first signal is a signal formed by superposing second signals sent by at least one second UE on a second time-frequency resource, and a time-domain resource of the first time-frequency resource belongs to a first time-domain resource unit; and controlling, by the first UE, uplink power on the first time-domain resource unit based on the measurement result.

The first time-domain resource unit is a currently scheduled time-domain resource unit; therefore, after determining the measurement result, the first UE controls power of uplink data on the current time-domain resource unit based on the measurement result.

In one embodiment, the uplink power may include the power of the uplink data and/or power of uplink control information. According to the uplink power control method provided in the first aspect, the first UE is UE that receives an uplink grant delivered by a network side device, and the second UE is UE that receives a downlink grant delivered by the network side device. The first UE measures the first signal on the first time-frequency resource, to obtain the measurement result, and controls the power of the uplink data on the first time-domain resource unit based on the measurement result. The first UE dynamically measures and senses the first signal, and flexibly controls the power of the uplink data based on the measurement result; therefore, UE-to-UE cross interference can be effectively reduced, thereby greatly improving system throughput.

In one embodiment, the controlling, by the first UE, power of uplink data on the first time-domain resource unit based on the measurement result includes:

selecting, by the first UE, at least one uplink power control parameter set from a preset power control parameter set based on the measurement result; and controlling, by the first UE, the power of the uplink data on the first time-domain resource unit based on the power control parameter.

The preset power control parameter set includes at least an open-loop parameter set ($P_0,\partial$) configured by the network side device in a semi-static manner and a closed-loop transmit power control (TPC for short) parameter that is specified by DCI.

In one embodiment, the measuring, by first UE, a first signal on a first time-frequency resource includes:

determining, by the first UE, a time-domain resource unit, a frequency-domain resource, a symbol resource, and a timing that are used for receiving the first signal, where the frequency-domain resource is indicated by a number of a physical resource block PRB that is scheduled for or allocated to the first UE, or the frequency-domain resource is on a predefined frequency-domain resource; and measuring, by the first UE, the first signal based on the time-domain resource unit, the frequency-domain resource, the symbol resource, and the timing.

The time-domain resource unit is used to indicate a time unit scheduled or allocated by the network side device in time domain; and the symbol resource is used to indicate, by using a symbol granularity, a time-domain resource for receiving the first signal.

In one embodiment, the determining, by the first UE, a time-domain resource unit for receiving the first signal includes:

determining, by the first UE in a static indication manner, a semi-static indication manner, or a dynamic indication manner, the time-domain resource unit for receiving the first signal.

In one embodiment, the determining, by the first UE, a symbol resource and a timing that are used for receiving the first signal includes:

determining, by the first UE based on a preset timing offset, control channel resource information, and a parameter of the first signal, the symbol resource and the timing that are used for receiving the first signal, where the control channel resource information is used to indicate a quantity of symbols of a downlink control region, and the parameter of the first signal is used to indicate a time length occupied by the symbols (which may also be indicated by using a subcarrier spacing).

According to the uplink power control method provided in the foregoing possible embodiments, the first UE determines the time-domain resource unit, the frequency-domain resource, the symbol resource, and the timing that are used for receiving the first signal, measures the first signal based on the time-domain resource unit, the frequency-domain resource, the symbol resource, and the timing, to obtain the measurement result, and then selects the at least one uplink power control parameter set from the preset power control parameter set based on the measurement result, to control the uplink power. A power control parameter may be flexibly selected based on the measurement result; therefore, the UE-to-UE interference can be effectively reduced, thereby improving the system throughput.

In one embodiment, the selecting, by the first UE, at least one uplink power control parameter set from a preset power control parameter set based on the measurement result includes:

determining, by the first UE based on the measurement result, an interference intensity sensed by the first UE;

performing, by the first UE, quantization processing on the interference intensity to obtain an interference level; and selecting, by the first UE, the at least one uplink power control parameter set from the preset power control parameter set based on the interference level.

In one embodiment, the determining, by the first UE based on the measurement result, an interference intensity sensed by the first UE includes:

determining, by the first UE based on a preset interference range to which measurement results on different RBs on the first time-frequency resource belong, a weight value of each RB in interference intensity calculation; and obtaining, by the first UE based on the weight value, the interference intensity sensed by the first UE.

According to the uplink power control method provided in the foregoing possible embodiments, after determining, based on the measurement result, the interference intensity sensed by the first UE, the first UE determines the interference level based on the interference intensity, and selects a proper power control parameter based on a correspondence between the interference level and the power control parameter set. In this way, the determined power control parameter is more accurate.

According to a second aspect, an embodiment of this application provides an uplink power control apparatus. The apparatus includes corresponding function modules, and the function modules may be used to perform the steps in the foregoing method. For technical effects of the apparatus, refer to beneficial effects brought by the first aspect and the possible designs of the first aspect. Details are not described herein again. The operations or functions may be implemented by using software, hardware, or a combination of software and hardware.

According to a third aspect, an embodiment of this application provides UE, including:

a receiver, configured to receive a first signal;

a processor, configured to measure the first signal on a first time-frequency resource, to obtain a measurement result, where the first signal is a signal formed by superposing second signals sent by at least one second UE on a second time-frequency resource, and a time-domain resource of the first time-frequency resource belongs to a first time-domain resource unit; and The processor is further configured to control power of uplink data on the first time-domain resource unit based on the measurement result.

In one embodiment, the processor is further configured to select at least one uplink power control parameter set from a preset power control parameter set based on the measurement result.

The processor is further configured to control the power of the uplink data on the first time-domain resource unit based on the power control parameter.

In one embodiment, the processor is further configured to: determine a time-domain resource unit, a frequency-domain resource, a symbol resource, and a timing that are used for receiving the first signal, where the frequency-domain resource is indicated by a number of a physical resource block PRB that is scheduled for or allocated to first UE, or the frequency-domain resource is on a predefined frequency-domain resource; the time-domain resource unit is a time unit scheduled or allocated by a network side device in time domain; and the symbol resource is used to indicate a time-domain resource for receiving the first signal.

The processor is further configured to measure the first signal based on the time-domain resource unit, the frequency-domain resource, the symbol resource, and the timing.

In one embodiment, the processor is further configured to determine, in a static indication manner, a semi-static indication manner, or a dynamic indication manner, the time-domain resource unit for receiving the first signal.

In one embodiment, the processor is further configured to determine, based on a preset timing offset, control channel resource information, and a parameter of the first signal, the symbol resource and the timing that are used for receiving the first signal, where the control channel resource information is used to indicate a quantity of symbols of a downlink control region, and the parameter of the first signal is used to indicate a time length occupied by the symbols.

In one embodiment, the processor is further configured to determine, based on the measurement result, an interference intensity sensed by the first UE.

The processor is further configured to perform quantization processing on the interference intensity to obtain an interference level.

The processor is further configured to select the at least one uplink power control parameter set from the preset power control parameter set based on the interference level.

In one embodiment, the processor is further configured to determine, based on a preset interference range to which measurement results on different RBs on the first time-frequency resource belong, a weight value of each RB in interference intensity calculation.

The processor is further configured to obtain, based on the weight value, the interference intensity sensed by the first UE.

For beneficial effects of the UE provided in the third aspect and the possible designs of the third aspect, refer to the beneficial effects brought by the first aspect and the possible designs of the first aspect. Details are not described herein again. According to a third aspect, an embodiment of this application provides an apparatus. The apparatus may include one or more processors and a communications unit. The one or more processors are configured to support the communications device in performing a corresponding function in the foregoing method. The communications unit is configured to support the communications device in communicating with another device, to implement a receiving and/or sending function.

In one embodiment, the communications device may further include one or more memories. The memory is configured to be coupled with the processor and stores a program instruction and data that are necessary for the communications device. The one or more memories may be integrated with the processor, or may be separated from the processor. This is not limited in this application.

The communications device may be a base station, a transmission point (TP; or transmitting and receiving point, TRP), or the like. The communications unit may be a transceiver or a transceiver circuit.

The communications device may also be a communications chip and may be disposed in a base station or a TRP. The communications unit may be an input/output circuit or interface of the communications chip.

The communications device may be a smart terminal, a wearable device, or the like, and the communications unit may be a transceiver or a transceiver circuit.

The communications device may alternatively be a communications chip and may be disposed in user equipment. The communications unit may be an input/output circuit or interface of the communications chip.

According to the uplink power control method and apparatus provided in the embodiments of this application, the first UE measures the first signal on the first time-frequency resource, to obtain the measurement result, and controls the power of the uplink data on the first time-domain resource unit based on the measurement result. The time-domain resource of the first time-frequency resource belongs to the first time-domain resource unit. The first UE dynamically measures and senses the first signal, and flexibly controls the power of the uplink data on the first time-domain resource unit based on the measurement result; therefore, UE-to-UE cross interference can be effectively reduced, thereby greatly improving system throughput.

BRIEF DESCRIPTION OF DRAWINGS

FIG. 9 is a schematic diagram of determining a time-domain resource unit by first UE in a dynamic indication manner;

FIG. 10 is a diagram of mapping between an interference level and a power control parameter;

FIG. 11 is a schematic structural diagram of an uplink power control apparatus according to an embodiment of this application;

DESCRIPTION OF EMBODIMENTS

Figure 1:
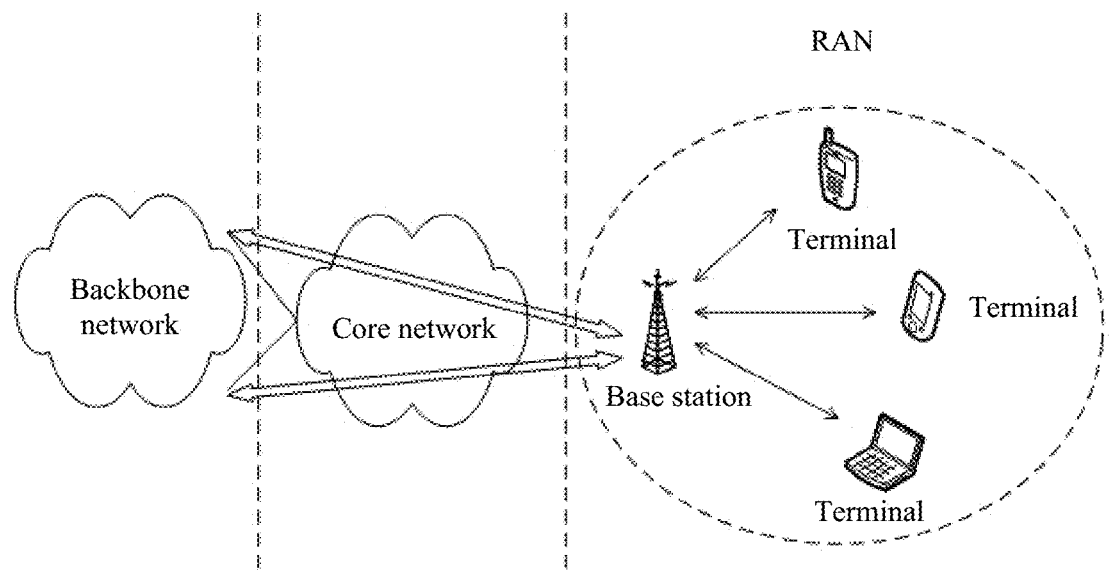
FIG. 1 is a framework diagram of a communications system.

The embodiments of this application are applicable to an LTE/fifth generation (5G for short) system. FIG. 1 is a framework diagram of a communications system. As shown in FIG. 1, the communications system includes a backbone network, a core network (CN for short), and a radio access network (RAN for short). A terminal is connected to the RAN by using a network side device, such as a base station, and is connected to the backbone network by using the core network, to exchange data with an external network or another network.

Figure 2:
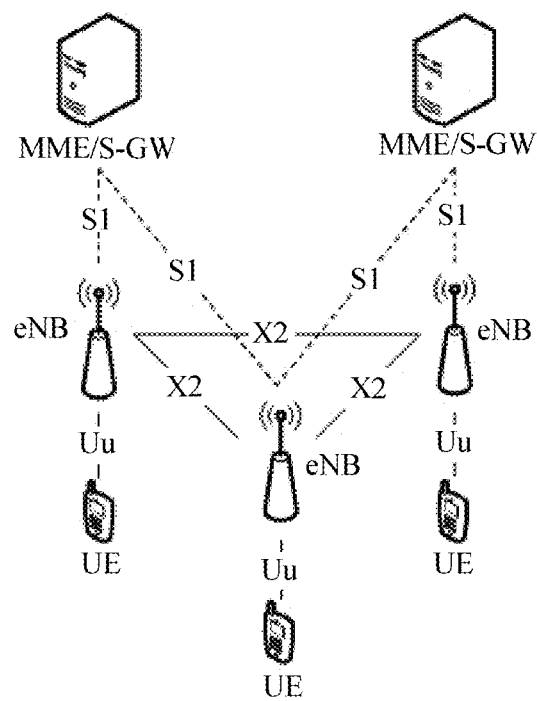
FIG. 2 is an architectural diagram of an LTE system.

LTE is used as an example to describe functions of network elements and interfaces in a system architecture. FIG. 2 is a system structural diagram of LTE. As shown in FIG. 2, a mobility management entity (MME for short), being a key control node in 3rd Generation Partnership Project (3GPP for short) LTE and a network element of a core network, is mainly responsible for signaling processing, that is, a control plane function, including functions such as access control, mobility management, attaching and detaching, session management, and gateway selection. A serving gateway (S-GW for short) is an important network element in the core network in 3GPP LTE and is mainly responsible for a user plane function of user data forwarding, that is, data packet routing and forwarding under control of the MME.

On an air interface side, an evolved NodeB (eNB for short) is mainly responsible for functions such as radio resource management, quality of service (QoS for short) management, and data compression and encryption. On a core network side, the eNB is mainly responsible for forwarding control plane signaling to the MME, and forwarding user plane service data to the S-GW.

UE is a device that is connected to a network side by using the eNB in LTE, and may be, for example, a handheld terminal, a notebook computer, or another device that can be connected to a network.

An S1 interface is a standard interface between the eNB and the core network. The eNB is connected to the MME by using an S1-MME interface, to transmit control signaling; and the eNB is connected to the S-GW by using an S1-U interface, to transmit user data. The S1-MME interface and the S1-U interface are collectively referred to as the S1 interface.

An X2 interface is a standard interface between eNBs and is configured to implement interworking between base stations.

A Uu interface is a wireless interface between the UE and the base station, and the UE is connected to an LTE network by using the Uu interface.

In the embodiments of this application, related devices include a network side device, such as a base station or another type of transmission point device. Certainly, the network side device is not limited to the foregoing two devices.

The base station may be an evolved NodeB (eNB or e-NodeB for short), a macro base station, a micro base station (also referred to as a "small cell"), a picocell base station, an access point (AP for short), a transmission point (TP for short), or the like in an LTE system or an evolved LTE system, or may be a base station in a future network, for example, a base station in a 5G network.

In the embodiments of this application, a terminal may also be referred to as user equipment (UE for short), or may be referred to as a terminal, a mobile station (MS for short), a mobile terminal, or the like. The terminal may communicate with one or more core networks through a radio access network (RAN for short). For example, the terminal may be a mobile phone (or referred to as a "cellular" phone) or a computer with a mobile terminal. For example, the terminal may alternatively be a portable mobile apparatus, a pocket-sized mobile apparatus, a handheld mobile apparatus, a computer built-in mobile apparatus, or an in-vehicle mobile apparatus, and they exchange voice and/or data with the radio access network. The terminal in the embodiments of the present invention may alternatively be a device-to-device (D2D for short) terminal or a machine-to-machine (M2M) terminal.

An uplink power control method related in the embodiments of this application is mainly specified in how to avoid UE-to-UE cross interference in a communications system. In the prior art, in LTE eIMTA, a dual-loop uplink power control enhanced solution that is based on a subframe set is used, including an open-loop power control enhanced solution and a closed-loop power control enhanced solution. The subframe set includes a variable subframe set and a fixed subframe set. UE-to-UE cross interference exists in the variable subframe set, but no cross interference exists in the fixed subframe set; therefore, different power control parameter sets are used for the two different types of subframe sets. However, although an open-loop power control parameter and a closed loop power control parameter depend on the two types of subframe sets, and this can implement subframe configuration mode switch and power control based on different data transmission service types, the UE-to-UE cross interference can be further reduced in this power control manner.

Therefore, an objective of the uplink power control method and an uplink power control apparatus that are provided in the embodiments of this application is to further reduce the UE-to-UE cross interference.

Figure 3:
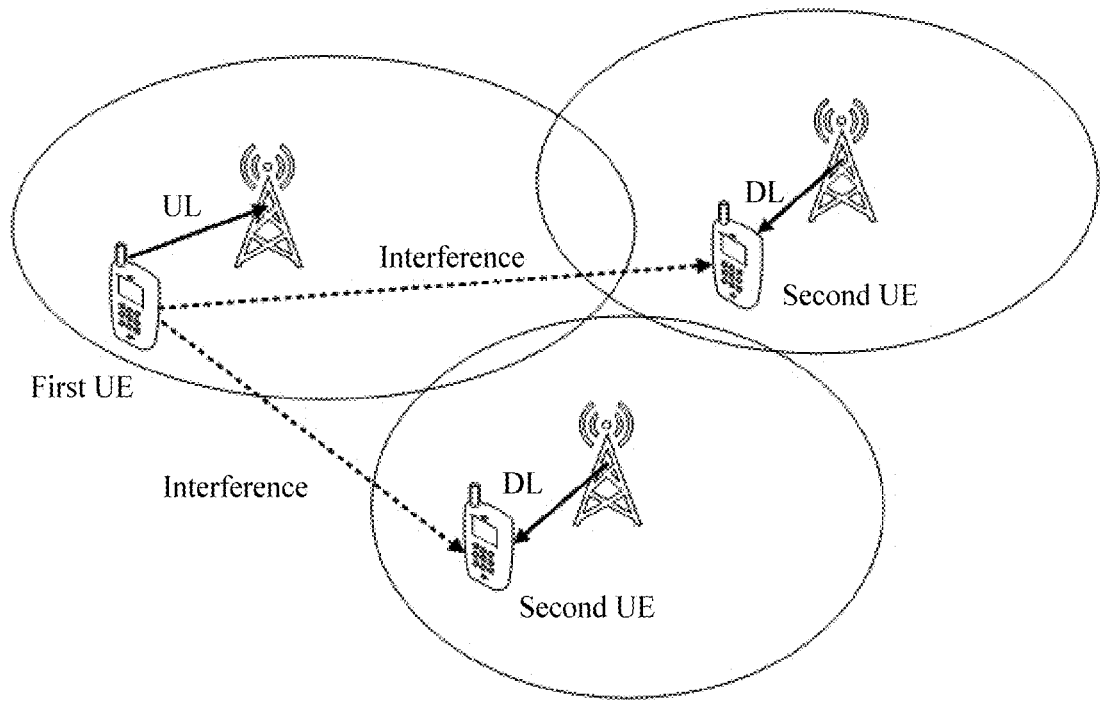
FIG. 3 is a schematic structural diagram of an uplink power control system according to an embodiment of this application.

FIG. 3 is a schematic structural diagram of an uplink power control system according to an embodiment of this application. As shown in FIG. 3, the system includes first UE and at least one second UE. Two second UEs are used as an example to describe this embodiment. The first UE is UE that receives an uplink grant (UL Grant for short) delivered by a network side, and the second UE is UE that receives a downlink grant (DL Grant for short) delivered by the network side. In actual application, first UE that is scheduled for uplink transmission causes interference to second UE that is in downlink scheduling in a neighboring cell. To reduce the interference, two second UEs may separately send second signals to the first UE on a second time-frequency resource. The first UE may measure a first signal formed by superposing the two second signals, and control uplink power based on a measurement result, so as to reduce interference to the second UE that is in the neighboring cell. The first signal may be, for example, a sensing signal, and the second signal is a superposed signal formed by superposing two sensing signals.

Figure 4:
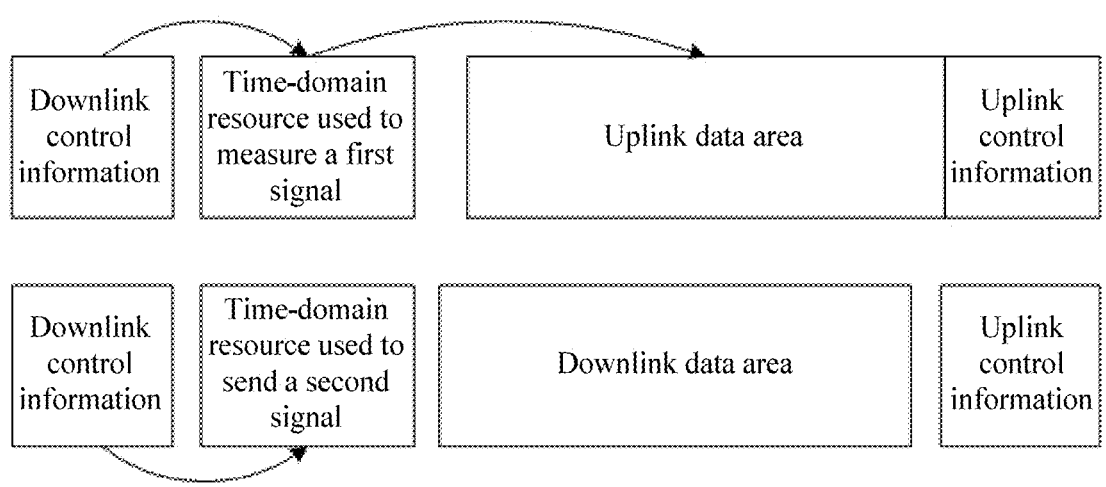
FIG. 4 is a schematic structural diagram of a time-domain resource unit.

Specifically, FIG. 4 is a schematic structural diagram of a time-domain resource unit. In one embodiment, the time-domain resource unit may sequentially include a downlink control region (used to carry downlink control information), a downlink data area, and an uplink control region (used to carry uplink control information). A time area is included between the downlink control region and the downlink data area. The time area may be used to send a sensing signal, and the sensing information is a signal used to measure UE-to-UE cross interference; therefore, the time area may also be referred to as a sensing area (that is, a time-domain resource used to send a second signal in the figure). In another embodiment, the time-domain resource unit may sequentially include a downlink control region, an uplink data region, and an uplink control region. A time area is included between the downlink control region and the uplink data region, and the time area is used as a guard interval (GP) for downlink/uplink switch between the downlink control region and the uplink data region. Further, the time area may be used to receive a sensing signal, and the sensing information is a signal used to measure UE-to-UE cross interference; therefore, the time area may also be referred to as a sensing area (that is, a time-domain resource used to measure a first signal in the figure). Based on the schematic structural diagram shown in FIG. 3, by using channel heterogeneity, the sensing signal may be sent by the second UE that is scheduled for downlink, and the superposed signal may be measured by the first UE that is scheduled for uplink, to obtain an interference intensity and an interference level. The first UE may use at least one uplink power control parameter set that is selected from a power control parameter set preconfigured by a base station side as a reference to control uplink power based on the obtained interference intensity, the interference level, and a variation relative to the preconfigured power control parameter set. In this case, it is highly complex for the base station side to determine, through blind detection, a modulation and coding scheme (MCS for short). Therefore, during specific implementation, when the uplink power is controlled in the time-domain resource unit, uplink control information may be sent before uplink data, and power control indication information may be carried by using the uplink control information. The indication information includes information such as the variation relative to the preconfigured power control parameter set and the MCS.

Specific embodiments are used below to describe in detail the technical solutions of this application. The following several specific embodiments may be combined with each other, and a same or similar concept or process may not be described repeatedly in some embodiments.

Figure 5:
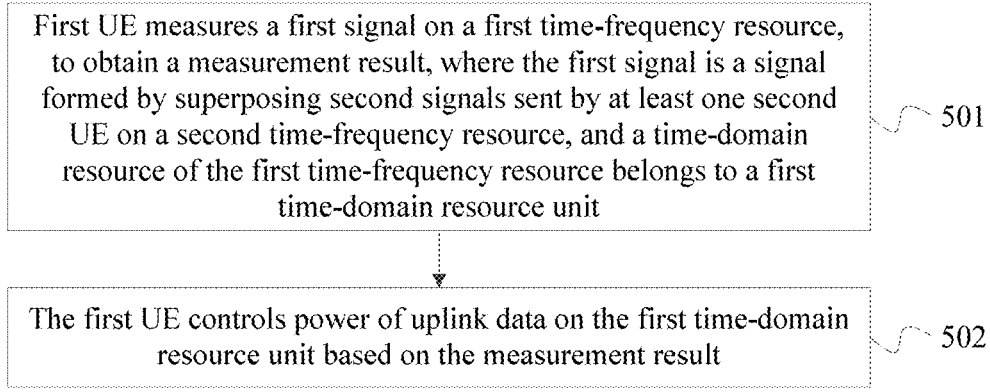
FIG. 5 is a schematic flowchart of an uplink power control method according to one embodiment of this application.

FIG. 5 is a schematic flowchart of an uplink power control method according to one embodiment of this application. This embodiment provides an uplink power control method. The method may be performed by any apparatus that performs an uplink power control method, and the apparatus may be implemented by using software and/or hardware. In this embodiment, the apparatus may be integrated into UE. As shown in FIG. 5, the method in this embodiment may include the following operations.

In operation 501, first UE measures a first signal on a first time-frequency resource, to obtain a measurement result, where the first signal is a signal formed by superposing second signals sent by at least one second UE on a second time-frequency resource, and a time-domain resource of the first time-frequency resource belongs to a first time-domain resource unit.

The first UE is UE that receives an uplink grant delivered by a network side device, and the second UE is UE that receives a downlink grant delivered by the network side device. The first time-domain resource unit is a current time-domain resource unit. It should be noted that, the time-domain resource unit may be a time-domain resource scheduling and allocation unit in wireless communications technologies such as LTE or a new radio access technology (New RAT, NR for short), and includes but is not limited to a subframe, a slot, a mini-slot, a transmission time interval (TTI for short), and the like. In addition, a time-frequency resource includes resources in two dimensions: time domain and frequency domain. A time-domain resource may include N symbol resource units, and N is a positive integer. A frequency-domain resource is a frequency band resource whose basic allocation unit is a resource block (RB) or a resource element (RE for short).

In one embodiment, the at least one second UE sends the second signals to the first UE on the second time-frequency resource, and the first signal may be formed by superposing at least one second signal. The first UE measures the superposed first signal on the first time-frequency resource, to obtain the measurement result. The first time-frequency resource may be predefined or may be indicated by the network side device by delivering control information. The control information may be dynamic control information such as uplink grant information, or may be semi-static control information such as radio resource control (RRC for short) signaling or a broadcast message. Similarly, the second time-frequency resource may be predefined or may be indicated by the network side device by delivering control information. The control information may be dynamic control information such as a downlink grant, or may be semi-static control information such as RRC signaling or a broadcast message. A specific manner of determining the first time-frequency resource and the second time-frequency resource is not limited herein in this embodiment.

For example, the second signal is a sensing signal sent by the second UE, and the following describes a process of sending the sensing signal by the second UE in detail.

When sending the sensing signal, the second UE needs to determine information such as a time-domain resource unit, a frequency-domain resource, a symbol resource, and a timing that are used for sending the sensing signal. In one embodiment, the second UE may determine, in a static indication manner, the time-domain resource unit on which the sensing signal needs to be sent, for example, all time-domain resource units that are scheduled for downlink or all time-domain resource units that are scheduled for downlink other than a fixed time-domain resource unit; or the second UE may determine, in a semi-static indication manner, the time-domain resource unit on which the sensing signal needs to be sent, for example, performing determining by using RRC signaling; or the second UE may determine, in a dynamic indication manner, the time-domain resource unit on which the sensing signal needs to be sent. A specific manner of determining the time-domain resource unit is not limited herein in this embodiment.

It should be noted that the time-domain resource unit may be, for example, a subframe. Referring to FIG. 4, an uplink subframe includes downlink control information, a time-domain resource used by the first UE to measure the first signal, an uplink data region, and uplink control information. The first UE may indicate a subframe type based on subframe type indication information in the downlink control information, that is, determining whether the subframe type is DL or UL. A size of the time-domain resource may be N symbols, and N is a positive integer greater than or equal to 1. The uplink data region may be used to transmit uplink data information, and the uplink control information may be used to transmit uplink control information.

Still referring to FIG. 4, a downlink subframe includes downlink control information, a time-domain resource used by the second UE to send the second signal, a downlink data area, and uplink control information. A structure of the downlink control information is similar to that in the uplink subframe, and details are not described herein again. A size of the time-domain resource may be N symbols, and N is a positive integer greater than or equal to 1. The downlink data area may be used to transmit downlink data information, and the uplink control information may be used to transmit uplink control information. In addition, a guard interval may be further included between the downlink data area and the uplink control information.

Figure 6:
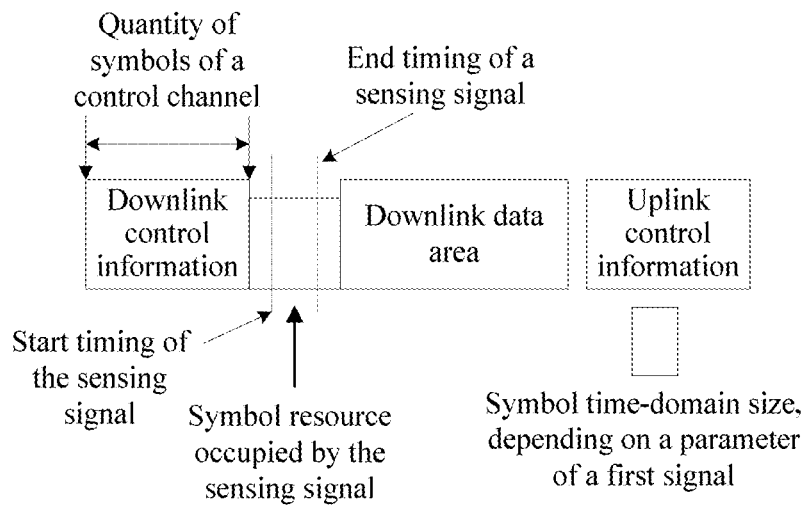
FIG. 6 is a schematic diagram of determining a symbol resource and a timing of a sensing signal.

In addition, the second UE may determine, based on a preset timing offset, control channel resource information, and a parameter of the sensing signal, the symbol resource and the timing that are used for sending the sensing signal. The parameter of the sensing signal may be, for example, a time interval in which a time-domain resource can occupy one symbol, for example, when a subcarrier spacing is 15 KHz, duration of one symbol is 66.7 µs. For example, FIG. 6 is a schematic diagram of determining the symbol resource and the timing of the sensing signal. As shown in FIG. 6, the control channel resource information is a quantity of symbols (which may be indicated by using the downlink control information) of a downlink control channel; the timing offset is a time offset amount of the sensing signal relative to the downlink control information, such as a time offset amount relative to a start location of a first symbol of the downlink control channel or a time offset amount relative to an end location of a last symbol of the downlink control channel; the parameter of the sensing signal includes information about a time length occupied by a symbol of the sensing signal; and the symbol resource indicates the time-domain resource for sending the sensing signal by the second UE. As shown in FIG. 6, a start timing and an end timing of the sensing signal may be determined based on the timing offset, the control channel resource information, and the parameter of the signal, and then the time-domain resource for sending the sensing signal may be determined.

In addition, the frequency-domain resource occupied by the sensing signal may be indicated by a number of a physical resource block (Physical Resource Block, PRB for short) allocated to the second UE, or may be on a predefined frequency-domain resource.

Figure 7:
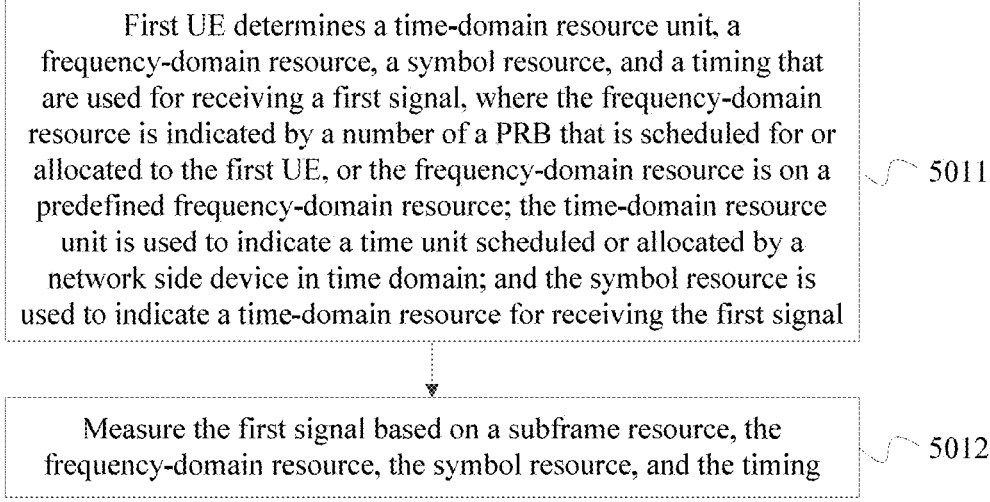
FIG. 7 is a schematic flowchart of measuring a first signal.

FIG. 7 is a schematic flowchart of measuring the first signal. Optionally, referring to FIG. 7, step 501 may specifically include the following operations.

In operation 5011, the first UE determines a time-domain resource unit, a frequency-domain resource, a symbol resource, and a timing that are used for receiving the first signal, where the frequency-domain resource is indicated by a number of a PRB that is scheduled for or allocated to the first UE, or the frequency-domain resource is on a predefined frequency-domain resource; the time-domain resource unit is used to indicate a time unit scheduled or allocated by a network side device in time domain; and the symbol resource is used to indicate a time-domain resource for receiving the first signal.

In operation, 5012, the first signal is measured based on a subframe resource, the frequency-domain resource, the symbol resource, and the timing.

In one embodiment, that the first UE determines a time-domain resource unit for receiving the first signal includes: the first UE determines, in a static indication manner, a semi-static indication manner, or a dynamic indication manner, the time-domain resource unit for receiving the first signal.

In one embodiment, that the first UE determines a symbol resource and a timing that are used for receiving the first signal includes: determining, based on a preset timing offset, control channel resource information, and a parameter of the first signal, the symbol resource and the timing that are used for receiving the first signal, where the control channel resource information is used to indicate a quantity of symbols of a downlink control region, and the parameter of the first signal is used to indicate a time length occupied by the symbols.

By using an example in which the first signal is a signal that is received by the first UE in an interference sensing phase and that is formed by superposing sensing signals sent by the at least one second UE, the following details a process of measuring the sensing signal by the first UE in the interference sensing phase.

When measuring the first signal, the first UE needs to determine information such as the time-domain resource unit, the frequency-domain resource, the symbol resource, and the timing that are used for receiving the first signal. During specific implementation, the first UE may determine, in the static indication manner, the time-domain resource unit for receiving the first signal, for example, all time-domain resource units that are scheduled for downlink or all time-domain resource units that are scheduled for downlink other than a fixed time-domain resource unit; or the first UE may determine, in the semi-static indication manner, the time-domain resource unit for receiving the first signal, for example, performing determining by using RRC signaling; or the first UE may determine, in the dynamic indication manner, the time-domain resource unit for receiving the first signal. A specific manner of determining the time-domain resource unit is not limited herein in this embodiment.

It should be noted that the time-domain resource unit may be, for example, a subframe. A structure of the subframe is similar to the structure of the subframe determined when the second UE sends the sensing signal. Details are not described herein again.

In addition, the first UE may determine, based on a preset timing offset, control channel resource information, and a parameter of the first signal, the symbol resource and the timing that are used for measuring the first signal. The parameter of the first signal may be, for example, a time interval in which a time-domain resource can occupy one symbol, for example, when a subcarrier spacing is 15 KHz, duration of one symbol is 66.7 µs. A manner in which the first UE determines the symbol resource and the timing that are used for measuring the first signal is similar to a manner in which the second UE determines the symbol resource and the timing that are used for sending the second signal. Details are not described herein again.

In addition, the frequency-domain resource occupied by the first signal may be indicated by the number of the PRB scheduled for or allocated to the first UE, or may be on the predefined frequency-domain resource.

The measurement result obtained by measuring the first signal by the first UE on the first time-frequency resource may be a radio resource management (RRM for short) measurement result of the first signal, such as reference signal received power (RSRP for short) of the first signal.

Figure 8:
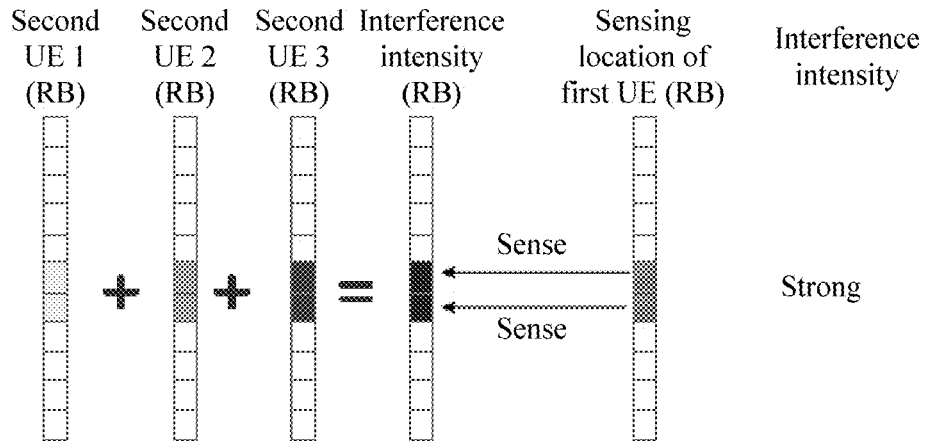
FIG. 8 is a schematic diagram of determining a time-domain resource unit by first UE in a predefined indication manner.

For example, FIG. 8 is a schematic diagram of determining the time-domain resource unit by the first UE in a predefined indication manner. As shown in FIG. 8, the second UE sends a sensing signal on a predefined transmission resource, and the first UE detects and senses an interference type on the predefined transmission resource, including whether there is interference or not, an interference intensity, and the like. The predefined transmission resource may occupy a fixed transmission resource of N resource blocks (Resource Block, RB for short) in the middle of system bandwidth, or may occupy another fixed transmission resource of the system bandwidth. A specific location of the transmission resource is not limited herein in this embodiment. In this embodiment, an example in which N is 2 is used for description. As shown in FIG. 8, it is assumed that there are three second UEs in the vicinity of a cell in which the first UE resides, that is, the three second UEs all need to send a sensing signal. Resources occupied by sensing signals of second UE 1, second UE 2, and second UE 3 are the same. All symbols specifically sent on RBs occupied by the sensing signals are set to 1, and power of the symbols is kept consistent. The resources occupied by the sensing signals sent by the three second UEs are exactly the same; therefore, the sensing signals are superposed together. By measuring a superposed sensing signal, the first UE may obtain an interference intensity.

FIG. 9 is a schematic diagram of determining the time-domain resource unit by the first UE in the dynamic indication manner. As shown in FIG. 9, the second UE may determine a resource allocation type of a physical downlink shared channel (PDSCH for short) based on a downlink control information (DCI for short) type and a downlink grant, and determine, based on the resource allocation type, a transmission resource allocated to the second UE. After the transmission resource is determined, the second UE obtains, based on a virtual resource block (VRB for short)-to-PRB resource mapping type, a number of a PRB of the allocated resource, and then sends a sensing signal on the PRB corresponding to the number of the PRB. Similarly, the first UE may determine a resource allocation type of a physical uplink shared channel (PUSCH for short) based on the DCI type and an uplink grant, and determine, based on the resource allocation type, a transmission resource allocated to the first UE. After the transmission resource is determined, the first UE obtains, based on the VRB-to-PRB resource mapping type, a number of a PRB of the allocated resource, and then measures and senses the first signal on the PRB corresponding to the number of the PRB. The resource allocation type is a transmission resource allocation manner, including a centralized allocation, a distributed allocation, and the like.

As shown in FIG. 9, it is assumed that there are three second UEs in the vicinity of a cell in which the first UE resides, that is, the three second UEs all need to send a sensing signal. Second UE 1, second UE 2, and second UE 3 all need to implement resource mapping of the sensing signals. All symbols specifically sent on RBs occupied by the sensing signals are set to 1, and power of the symbols is kept consistent. Resources occupied by the sensing signals sent by the three second UEs are not entirely orthogonal; therefore, superposition occurs. The first UE performs measurement and sensing based on a resource allocation and a mapped RB location that are indicated by DCI and a related field, to obtain the measurement result. The related field may be, for example, an uplink resource indicated in UL Grant.

Referring back to FIG. 5, in operation 502, the first UE controls uplink power on the first time-domain resource unit based on the measurement result.

The uplink power may include power of uplink data and/or power of uplink control information.

In this embodiment, after obtaining the measurement result, the first UE controls the uplink power based on the measurement result, to reduce interference to each second UE, so as to improve system throughput.

In one embodiment, the first time-frequency resource belongs to a first time-frequency resource unit; therefore, that the first UE controls uplink power based on the measurement result includes: the first UE controls the uplink power on the first time-frequency resource unit based on the measurement result.

Specifically, the first time-frequency resource unit is a current time-frequency resource; therefore, after determining the measurement result, the first UE controls the uplink power on the current time-frequency resource, that is, controlling the uplink power on a current subframe.

In one embodiment, that the first UE controls uplink power based on the measurement result includes: the first UE selects at least one uplink power control parameter set from a preset power control parameter set based on the measurement result, and controls the uplink power based on the power control parameter.

The preset power control parameter set includes at least an open-loop parameter set $(P_0, \partial)$ configured by the network side device in a semi-static manner and a closed-loop TPC parameter that is specified by the DCI.

Specifically, after obtaining the measurement result by measuring the first signal on the first time-frequency resource, the first UE performs, based on the measurement result, selection in the power control parameter set configured by the network side device, to select at least one proper power control parameter.

In one embodiment, the selecting at least one uplink power control parameter set from a preset power control parameter set based on the measurement result includes: determining, based on the measurement result, an interference intensity sensed by the first UE; performing quantization processing on the interference intensity to obtain an interference level; and selecting the at least one uplink power control parameter set from the preset power control parameter set based on the interference level.

Specifically, the first UE may determine, based on a preset interference measurement range to which measurement results on different RBs belong, a weight value of each RB in interference intensity calculation; and obtain, based on the weight value, the interference intensity sensed by the first UE. During specific implementation, after determining the weight value of each RB in interference intensity calculation, the first UE obtains, based on the weight value, the interference intensity sensed by the first UE. The interference intensity is related to a measurement result on each RB, and may be calculated by using a formula. A specific form of the interference intensity is not limited herein in this embodiment.

For example, if the preset interference measurement range may be divided into N ranges based on different power intensities, where N is a positive integer and an example in which N=5 is used in this embodiment, five interference measurement ranges and corresponding weight values are shown in Table 1.

TABLE 1

| Interference measurement range | Weight value |
| --- | --- |
| (−20 dBm, −10 dBm) | 0.1 |
| (−10 dBm, 0 dBm) | 0.3 |
| (0 dBm, 5 dBm) | 0.6 |
| (5 dBm, 10 dBm) | 1.0 |
| (10 dBm, 15 dBm) | 2.0 |

If interference powers measured on three RBs are −15 dBm, −3 dBm, and 6 dBm, the sensed interference intensity is 0.1+0.3+1.0=1.4.

After determining the interference intensity, the first UE performs, based on a preset interference threshold, quantization processing on the determined interference intensity, to determine the interference level. In actual application, the interference level may be obtained based on a preset mapping relationship between the interference intensity and the interference level. For example, after the interference intensity is determined, the interference level is obtained based on a mapping relationship in Table 2.

TABLE 2

| Interference intensity | Interference level |
| --- | --- |
| 0-1.0 | 1 |
| 1.0-2.0 | 2 |
| 2.0-2.5 | 3 |
| 2.5-3 | 4 |
| 3.5-4.0 | 5 |

According to the mapping relationship in Table 2, when the interference intensity is 1.4, the interference level is 2.

The network side device provides N optional power control parameter sets for the first UE to perform flexible selection based on a testing result. The optional power control parameter sets are corresponding to different transmit power of the first UE, so that the first UE can perform selection more flexibly. N is an integer greater than or equal to 2. The first UE selects the proper power control parameter from the power control parameter sets based on the interference level, to control the uplink power. For example, FIG. 10 is a diagram of mapping between the interference level and the power control parameter. As shown in FIG. 10, the interference level may be divided into N levels, and an example in which N=9 is used for description in this embodiment. Assuming that the interference level determined by the first UE is 4, power control parameters P0_4, $\partial\_4$, and TPC_4 may be selected based on the mapping relationship in FIG. 7.

A person skilled in the art may understand that, an optional pre-definition may be as follows: A higher interference level indicates that greater interference is caused to second UE that is in a neighboring cell if the first UE does not control the uplink power. Therefore, the first UE selects a proper uplink power control parameter based on the determined interference level, to send a subsequent uplink subframe.

According to the uplink power control method provided in this embodiment of this application, the first UE measures the first signal on the first time-frequency resource, to obtain the measurement result, and controls the uplink power based on the measurement result. The first UE dynamically measures and senses the first signal, and flexibly controls the uplink power based on the measurement result; therefore, UE-to-UE cross interference can be effectively reduced, thereby greatly improving system throughput.

In addition, it needs to be emphasized that, interference measurement mechanisms and precisions used by UEs produced by different terminal device manufactures are different, and consequently, inconsistency of the interference measurement and unfairness in power parameter selection may be caused. To resolve this problem, the following solution may be used: In an initial phase in which UE is connected to a network, the UE may report a measurement capability of the UE to a network side device, and the network side device delivers, based on a distinctive interference measurement capability of each UE, an optional parameter set to the UE.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

FIG. 11 is a schematic structural diagram of an uplink power control apparatus according to an embodiment of this application. The control apparatus may be independent UE, or may be an apparatus that is integrated into UE. The apparatus may be implemented by using software, hardware, or a combination of software and hardware. As shown in FIG. 11, the apparatus includes:

a measurement module 11, configured to measure a first signal on a first time-frequency resource, to obtain a measurement result, where the first signal is a signal formed by superposing second signals sent by at least one second UE on a second time-frequency resource, and a time-domain resource of the first time-frequency resource belongs to a first time-domain resource unit; and a control module 12, configured to control power of uplink data on the first time-domain resource unit based on the measurement result.

In one embodiment, the measurement module 11 and the control module 12 may be corresponding to a processor in the uplink power control apparatus.

The uplink power control apparatus provided in this embodiment of this application may execute the foregoing method embodiments, implementation principles and technical effects thereof are similar, and details are not described herein again.

Figure 12:
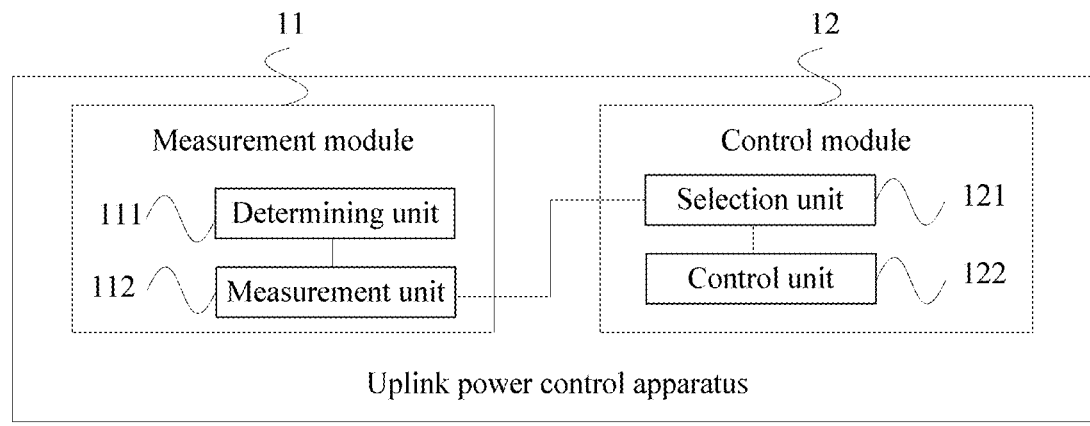
FIG. 12 is a schematic structural diagram of Embodiment 2 of an uplink power control apparatus according to an embodiment of this application.

FIG. 12 is a schematic structural diagram of an uplink power control apparatus according to another embodiment of this application. Based on the foregoing embodiment, further, the control module 12 includes a selection unit 121 and a control unit 122.

The selection unit 121 is configured to select at least one uplink power control parameter set from a preset power control parameter set based on the measurement result.

The control unit 122 is configured to control the power of the uplink data on the first time-domain resource unit based on the power control parameter.

Still referring to FIG. 12, optionally, the measurement module 11 may further include a receiving determining unit 111 and a measurement unit 112.

The determining unit 111 is configured to: determine a time-domain resource unit, a frequency-domain resource, a symbol resource, and a timing that are used for receiving the first signal, where the frequency-domain resource is indicated by a number of a physical resource block PRB that is scheduled for or allocated to first UE, or the frequency-domain resource is on a predefined frequency-domain resource; the time-domain resource unit is used to indicate a time unit scheduled or allocated by a network side device in time domain; and the symbol resource is used to indicate a time-domain resource for receiving the first signal.

The measurement unit 112 is configured to measure the first signal based on the time-domain resource unit, the frequency-domain resource, the symbol resource, and the timing.

In one embodiment, the determining unit 111 is further configured to determine, in a static indication manner, a semi-static indication manner, or a dynamic indication manner, the time-domain resource unit for receiving the first signal.

In one embodiment, the determining unit 111 is further configured to determine, based on a preset timing offset, control channel resource information, and a parameter of the first signal, the symbol resource and the timing that are used for receiving the first signal, where the control channel resource information is used to indicate a quantity of symbols of a downlink control region, and the parameter of the first signal is used to indicate a time length occupied by the symbols.

In one embodiment, the selection unit 121 is further configured to:

determine, based on the measurement result, an interference intensity sensed by the first UE;

perform quantization processing on the interference intensity to obtain an interference level; and select the at least one uplink power control parameter set from the preset power control parameter set based on the interference level.

In one embodiment, the selection unit 121 is further configured to:

determine, based on a preset interference range to which measurement results on different RBs on the first time-frequency resource belong, a weight value of each RB in interference intensity calculation; and obtain, based on the weight value, the interference intensity sensed by the first UE;

The uplink power control apparatus provided in this embodiment of this application may execute the foregoing method embodiments, implementation principles and technical effects thereof are similar, and details are not described herein again.

Figure 13:
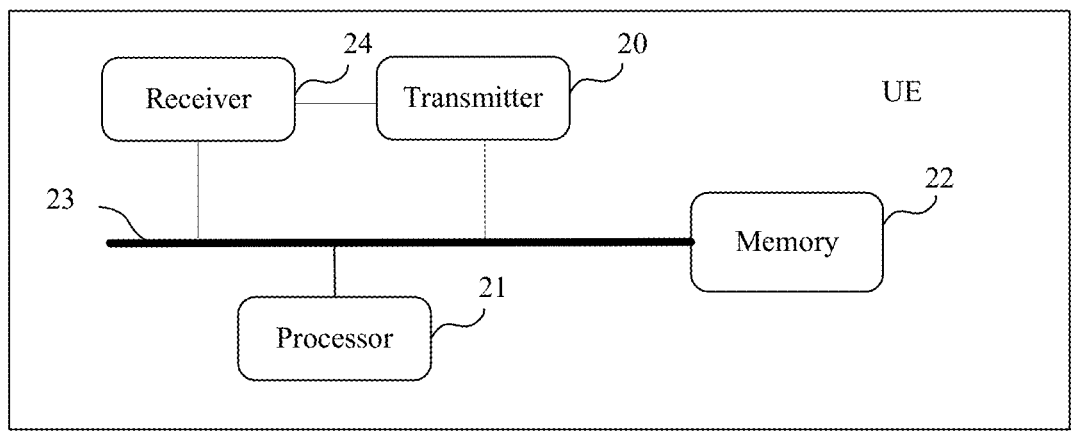
FIG. 13 is a schematic structural diagram of an embodiment of UE according to an embodiment of this application.

FIG. 13 is a schematic structural diagram of an embodiment of UE according to an embodiment of this application. As shown in FIG. 13, the UE may include a transmitter 20, a processor 21, and at least one communications bus 23. The communications bus 23 is configured to implement a communication connection between components. Optionally, the UE may further include a memory 22. The memory 22 may include a high speed RAM memory, and may also include a non-volatile memory NVM, for example, at least one magnetic disk memory. The memory 22 may store various programs used to complete various processing functions and implement method steps of this embodiment. The UE may further include a receiver 24. The receiver 24 in this embodiment may be a corresponding input interface that has a communication function and an information receiving function, or may be a radio frequency module or a baseband module on the UE. The transmitter 20 in this embodiment may be a corresponding output interface that has a communication function and an information sending function, or may be a radio frequency module or a baseband module on the UE. Optionally, the transmitter 20 and the receiver 24 may be integrated into one communications interface, or may be two independent communications interfaces.

In this embodiment, the receiver 24 is configured to receive a first signal.

The processor 21 is configured to measure the first signal on a first time-frequency resource, to obtain a measurement result, where the first signal is a signal formed by superposing second signals sent by at least one second UE on a second time-frequency resource, and a time-domain resource of the first time-frequency resource belongs to a first time-domain resource unit.

The processor 21 is further configured to control power of uplink data on the first time-domain resource unit based on the measurement result.

Optionally, the processor 21 is further configured to select at least one uplink power control parameter set from a preset power control parameter set based on the measurement result; and control the power of the uplink data on the first time-domain resource unit based on the power control parameter.

In one embodiment, the processor 21 is further configured to: determine a time-domain resource unit, a frequency-domain resource, a symbol resource, and a timing that are used for receiving the first signal, where the frequency-domain resource is indicated by a number of a physical resource block PRB that is scheduled for or allocated to first UE, or the frequency-domain resource is on a predefined frequency-domain resource; the time-domain resource unit is used to indicate a time unit scheduled or allocated by a network side device in time domain; and the symbol resource is used to indicate a time-domain resource for receiving the first signal.

The processor 21 is further configured to measure the first signal based on the time-domain resource unit, the frequency-domain resource, the symbol resource, and the timing.

In one embodiment, the processor 21 is further configured to determine, in a static indication manner, a semi-static indication manner, or a dynamic indication manner, the time-domain resource unit for receiving the first signal.

In one embodiment, the processor 21 is further configured to determine, based on a preset timing offset, control channel resource information, and a parameter of the first signal, the symbol resource and the timing that are used for receiving the first signal, where the control channel resource information is used to indicate a quantity of symbols of a downlink control region, and the parameter of the first signal is used to indicate a time length occupied by the symbols.

In one embodiment, the processor 21 is further configured to determine, based on the measurement result, an interference intensity sensed by the first UE.

The processor 21 is further configured to perform quantization processing on the interference intensity to obtain an interference level.

The processor 21 is further configured to select the at least one uplink power control parameter set from the preset power control parameter set based on the interference level.

In one embodiment, the processor 21 is further configured to determine, based on a preset interference range to which measurement results on different RBs on the first time-frequency resource belong, a weight value of each RB in interference intensity calculation.

The processor 21 is further configured to obtain, based on the weight value, the interference intensity sensed by the first UE.

The UE provided in this embodiment of this application may execute the foregoing method embodiments, implementation principles and technical effects thereof are similar, and details are not described herein again.

What is claimed is:

1. An uplink power control method, comprising:
measuring, by a first terminal device, a first signal on a first time-frequency resource, to obtain a measurement result, wherein the first signal is a signal formed by superposing second signals sent by at least one second terminal device on second time-frequency resources, and a time-domain resource of the first time-frequency resource belongs to a first time-domain resource unit, the first terminal device and the at least one second terminal device belonging to a network configured with dynamic time division duplex (TDD) and the first terminal device being scheduled for uplink transmission receiving an uplink grant delivered by a network side causing interference to the at least one second terminal device that is in downlink scheduling in a neighboring cell and receives a downlink grant; and controlling, by the first terminal device, power of uplink data on the first time-domain resource unit based on the measurement result;

wherein measuring the first signal on the first time-frequency resource comprises:
determining, by the first terminal device, a time-domain resource unit, a frequency-domain resource, a symbol resource, and a start timing and end timing that are used for receiving the first signal, wherein the frequency-domain resource is indicated by a number of a physical resource block (PRB) that is scheduled for or allocated to the first terminal device, or the frequency-domain resource is on a predefined frequency-domain resource; and measuring, by the first terminal device, the first signal based on the time-domain resource unit, the frequency-domain resource, the symbol resource, and the start timing and end timing;

the at least one second terminal device determining a resource allocation type of a physical downlink shared channel (PDSCH) based on a downlink control information (DCI) type and the downlink grant, determining, based on the resource allocation type, a transmission resource allocated to the at least one second terminal device, and, after the transmission resource is determined, the at least one second terminal device obtaining, based on a virtual resource block (VRB) to PRB resource mapping type, a number of a PRB of the allocated resource, and then sending the second signal on the PRB corresponding to the number of the PRB; and wherein determining the time-domain resource unit for receiving the first signal comprises determining, by the first terminal device, in a dynamic indication manner the time-domain resource unit for receiving the first signal, by the first terminal device determining a resource allocation type of a physical uplink shared channel (PUSCH) based on the DCI type and the uplink grant, determining, based on the resource allocation type, the transmission resource allocated to the first terminal device, and after the transmission resource is determined, the first terminal device obtaining, based on the VRB-to-PRB resource mapping type, a number of a resource block of the allocated resource, and then measuring and sensing the first signal on the resource block corresponding to the number of the resource block, the resource allocation type being a transmission allocation manner including a centralized allocation and a distributed allocation; and wherein the first terminal device measures the first signal on the first time-frequency resource whilst the at least one second terminal device sends the superposed second signals by occupying respective second time-frequency resources.

2. The method according to claim 1, wherein controlling the power of uplink data on the first time-domain resource unit based on the measurement result comprises:
selecting, by the first terminal device, at least one uplink power control parameter set from a preset power control parameter set based on the measurement result; and controlling, by the first terminal device, the power of the uplink data on the first time-domain resource unit based on the power control parameter.

3. The method according to claim 2, wherein selecting the at least one uplink power control parameter set from the preset power control parameter set based on the measurement result comprises:
    determining, by the first terminal device based on the measurement result, an interference intensity sensed by the first terminal device;
    performing, by the first terminal device, quantization processing on the interference intensity to obtain an interference level; and
    selecting, by the first terminal device, the at least one uplink power control parameter set from the preset power control parameter set based on the interference level.

4. The method according to claim 3, wherein determining the interference intensity sensed by the first terminal device comprises:
    determining, by the first terminal device based on a preset interference range to which measurement results on different PRBs on the first time-frequency resource belong, a weight value of each PRB in an interference intensity calculation; and
    obtaining, by the first terminal device based on the weight value, the interference intensity sensed by the first terminal device.

5. The method according to claim 1, wherein determining the symbol resource and the start timing and the end timing of the first signal comprises:
    determining, by the first terminal device based on a preset timing offset, control channel resource information, and a parameter of the first signal, the symbol resource and the timing that are used for receiving the first signal, wherein the control channel resource information is used to indicate a quantity of symbols of a downlink control region, and the parameter of the first signal is used to indicate a time length occupied by the symbols.

6. A system comprising:
    a first terminal device; and
    at least one second terminal device;
    wherein the first terminal device comprises an uplink power control apparatus comprising a receiver and a processor;
    the receiver of the uplink power control apparatus of the first terminal device configured to receive a first signal; and
    the processor of the uplink power control apparatus of the first terminal device configured to measure the first signal on a first time-frequency resource, to obtain a measurement result, wherein the first signal is a signal formed by superposing second signals sent by the at least one second terminal device on second time-frequency resources, and a time-domain resource of the first time-frequency resource belongs to a first time-domain resource unit, the first terminal device and the at least one second terminal device belonging to a network configured with dynamic time division duplex (TDD) and the first terminal device being scheduled for uplink transmission receiving an uplink grant delivered by a network side causing interference to the at least one second terminal device that is in downlink scheduling in a neighboring cell and receives a downlink grant; and the processor of the uplink power control apparatus of the first terminal device is further configured to control power of uplink data on the first time-domain resource unit based on the measurement result; wherein
the processor of the uplink power control apparatus of the first terminal device is further configured to determine a time-domain resource unit, a frequency-domain resource, a symbol resource, and a start timing and end timing that are used for receiving the first signal, wherein the frequency-domain resource is indicated by a number of a physical resource block (PRB) that is scheduled for or allocated to a first terminal device, or the frequency-domain resource is on a predefined frequency-domain resource; and
the processor of the uplink power control apparatus of the first terminal device is further configured to measure the first signal based on the time-domain resource unit, the frequency-domain resource, the symbol resource, and the start timing and end timing;
the at least one second terminal device configured to determine a resource allocation type of a physical downlink shared channel (PDSCH) based on a downlink control information (DCI) type and the downlink grant, to determine, based on the resource allocation type, a transmission resource allocated to the second terminal, and, to obtain, after the transmission resource is determined, based on a virtual resource block (VRB) to PRB resource mapping type, a number of a PRB of the allocated resource, and then to send the second signal on the PRB corresponding to the number of the PRB; and
wherein determining, by the uplink power control apparatus of the first terminal device, the time-domain resource unit for receiving the first signal comprises determining, by the first terminal device, in a dynamic indication manner the time-domain resource unit for receiving the first signal, by the uplink power control apparatus of the first terminal device determining a resource allocation type of a physical uplink shared channel (PUSCH) based on the DCI type and the uplink grant, determining, based on the resource allocation type, the transmission resource allocated to the first terminal device, and after the transmission resource is determined, the first terminal device obtaining, based on the VRB-to-PRB resource mapping type, a number of a resource block of the allocated resource, and then measuring and sensing the first signal on the resource block corresponding to the number of the resource block, the resource allocation type being a transmission allocation manner including a centralized allocation and a distributed allocation; and
wherein the first terminal device is configured to measure the first signal on the first time-frequency resource whilst the at least one second terminal device sends the superposed second signals by occupying respective second time-frequency resources.

7. The system according to claim 6, wherein
the processor of the uplink power control apparatus of the first terminal device is further configured to select at least one uplink power control parameter set from a preset power control parameter set based on the measurement result; and
the processor of the uplink power control apparatus of the first terminal device is further configured to control the power of the uplink data on the first time-domain resource unit based on the power control parameter.

8. The system according to claim 7, wherein to select the at least one uplink power control parameter set from the preset power control parameter set based on the measurement result, the processor of the uplink power control apparatus of the first terminal device is further configured to:
determine, based on the measurement result, an interference intensity sensed by the first terminal device;
perform quantization processing on the interference intensity to obtain an interference level; and
select the at least one uplink power control parameter set from the preset power control parameter set based on the interference level.

9. The system according to claim 8, wherein to determine the interference intensity sensed by the first terminal device, the processor of the uplink power control apparatus of the first terminal device is further configured to:
determine, based on a preset interference range to which measurement results on different PRBs on the first time-frequency resource belong, a weight value of each PRB in interference intensity calculation; and
the processor of the uplink power control apparatus of the first terminal device is further configured to obtain, based on the weight value, the interference intensity sensed by the first terminal device.

10. The system according to claim 6, wherein to determine the symbol resource and the start timing and the end timing of the first signal, the processor of the uplink power control apparatus of the first terminal device is further configured to determine, based on a preset timing offset, control channel resource information, and a parameter of the first signal, the symbol resource and the timing that are used for receiving the first signal, wherein the control channel resource information is used to indicate a quantity of symbols of a downlink control region, and the parameter of the first signal is used to indicate a time length occupied by the symbols.

11. A non-transitory machine readable storage medium having instructions stored therein, which when executed by a processor, cause the processor to perform operations, the operations comprising:
measuring, by a first terminal device, a first signal on a first time-frequency resource to obtain a measurement result, wherein the first signal is a signal formed by superposing second signals sent by at least one second terminal device on second time-frequency resources, and a time-domain resource of the first time-frequency resource belongs to a first time-domain resource unit, the first terminal device and the at least one second terminal device belonging to a network configured with dynamic time division duplex (TDD) and the first terminal device being scheduled for uplink transmission receiving an uplink grant delivered by a network side causing interference to the at least one second terminal device that is in downlink scheduling in a neighboring cell and receives a downlink grant; and
controlling, by the first terminal device, power of uplink data on the first time-domain resource unit based on the measurement result;
wherein measuring the first signal on the first time-frequency resource comprises:
determining, by the first terminal device, a time-domain resource unit, a frequency-domain resource, a symbol resource, and a start timing and end timing that are used for receiving the first signal, wherein the frequency-domain resource is indicated by a number of a physical resource block (PRB) that is scheduled for or allocated to the first terminal device, or the frequency-domain resource is on a predefined frequency-domain resource; and
measuring, by the first terminal device, the first signal based on the time-domain resource unit, the frequency-domain resource, the symbol resource, and the start timing and end timing;
the at least one second terminal device determining a resource allocation type of a physical downlink shared channel (PDSCH) based on a downlink control information (DCI) type and the downlink grant, determining, based on the resource allocation type, a transmission resource allocated to the at least one second terminal device, and, after the transmission resource is determined, the at least one second terminal device obtaining, based on a virtual resource block (VRB) to PRB resource mapping type, a number of a PRB of the allocated resource, and then sending the second signal on the PRB corresponding to the number of the PRB; and
wherein determining the time-domain resource unit for receiving the first signal comprises determining, by the first terminal device, in a dynamic indication manner the time-domain resource unit for receiving the first signal, by the first terminal device determining a resource allocation type of a physical uplink shared channel (PUSCH) based on the DCI type and the uplink grant, determining, based on the resource allocation type, the transmission resource allocated to the first terminal device, and after the transmission resource is determined, the first terminal device obtaining, based on the VRB-to-PRB resource mapping type, a number of a resource block of the allocated resource, and then measuring and sensing the first signal on the resource block corresponding to the number of the resource block, the resource allocation type being a transmission allocation manner including a centralized allocation and a distributed allocation; and
wherein the first terminal device measures the first signal on the first time-frequency resource whilst the at least one second terminal device sends the superposed second signals by occupying respective second time-frequency resources.

12. The machine readable storage medium according to claim 11, wherein controlling the power of uplink data on the first time-domain resource unit based on the measurement result comprises:
selecting, by the first terminal device, at least one uplink power control parameter set from a preset power control parameter set based on the measurement result; and
controlling, by the first terminal device, the power of the uplink data on the first time-domain resource unit based on the power control parameter.

13. The machine readable storage medium according to claim 12, wherein selecting the at least one uplink power control parameter set from the preset power control parameter set based on the measurement result comprises:
determining, by the first terminal device based on the measurement result, an interference intensity sensed by the first terminal device;
performing, by the first terminal device, quantization processing on the interference intensity to obtain an interference level; and
selecting, by the first terminal device, the at least one uplink power control parameter set from the preset power control parameter set based on the interference level.

14. The machine readable storage medium according to claim 13, wherein determining the interference intensity sensed by the first terminal device comprises:
- determining, by the first terminal device based on a preset interference range to which measurement results on different PRBs on the first time-frequency resource belong, a weight value of each PRB in an interference intensity calculation; and
- obtaining, by the first terminal device based on the weight value, the interference intensity sensed by the first terminal device.

15. The machine readable storage medium according to claim 11, wherein determining the symbol resource and the start timing and the end timing of the first signal comprises:
- determining, by the first terminal device based on a preset timing offset, control channel resource information, and a parameter of the first signal, the symbol resource and the timing that are used for receiving the first signal, wherein the control channel resource information is used to indicate a quantity of symbols of a downlink control region, and the parameter of the first signal is used to indicate a time length occupied by the symbols.

* * * * *